Aug. 27, 1935.　　J. H. GRAYSON ET AL　　2,012,532
TIME CONTROLLED VALVE
Filed Sept. 14, 1931　　3 Sheets-Sheet 1
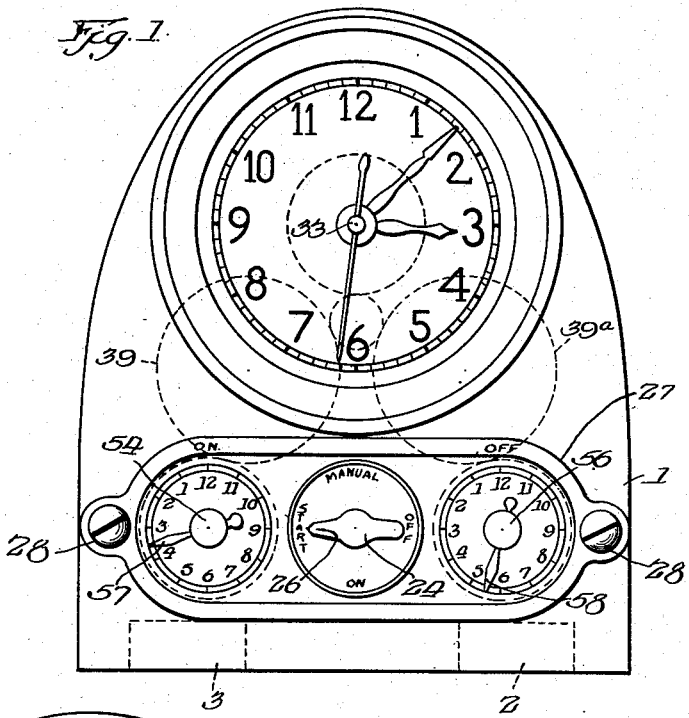
Inventors:
John H Grayson +
Franz Netschert.
By: Wilson, Dowell, McCanna & Rehm
Attys
Witness:
A.B.Davison

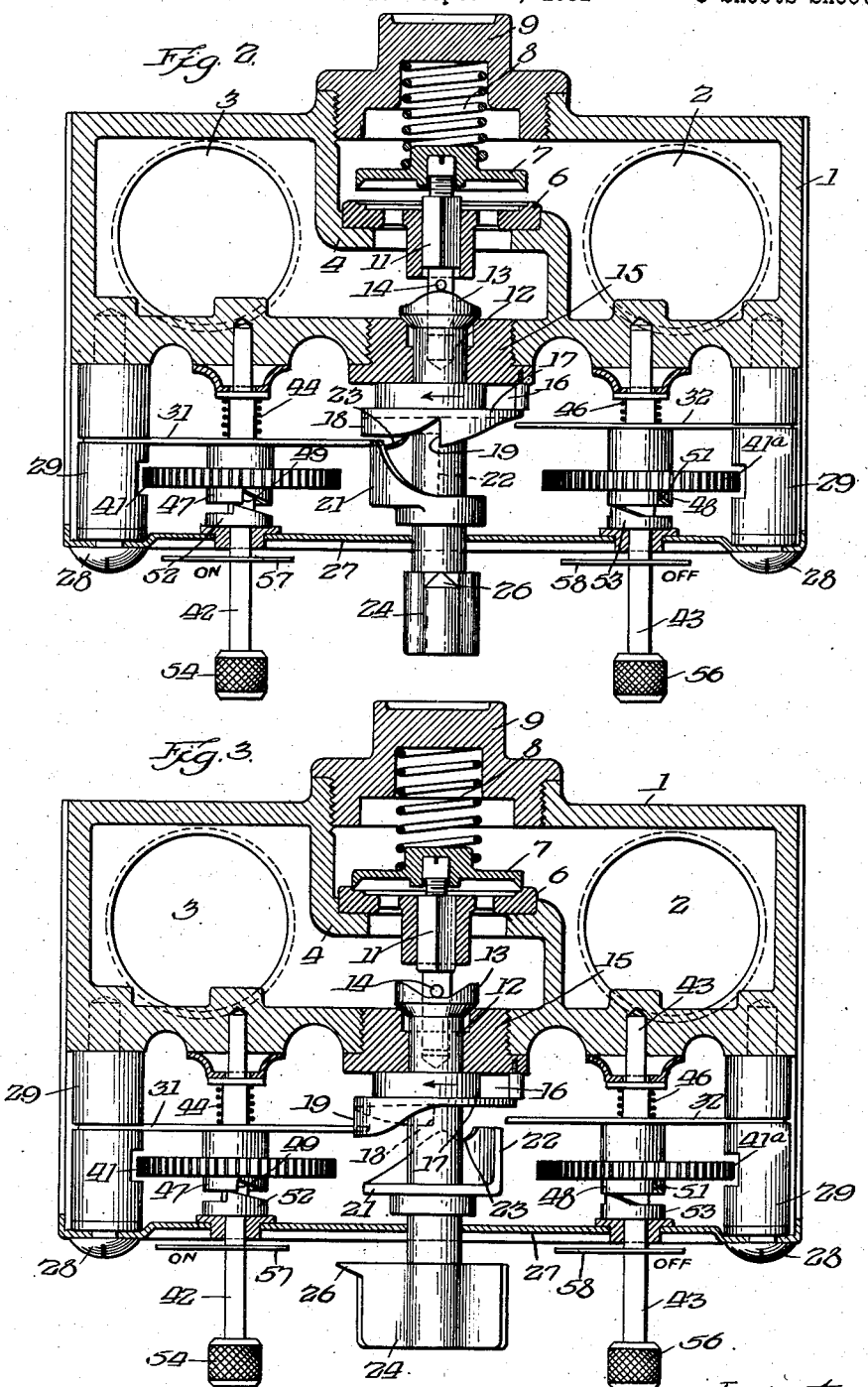

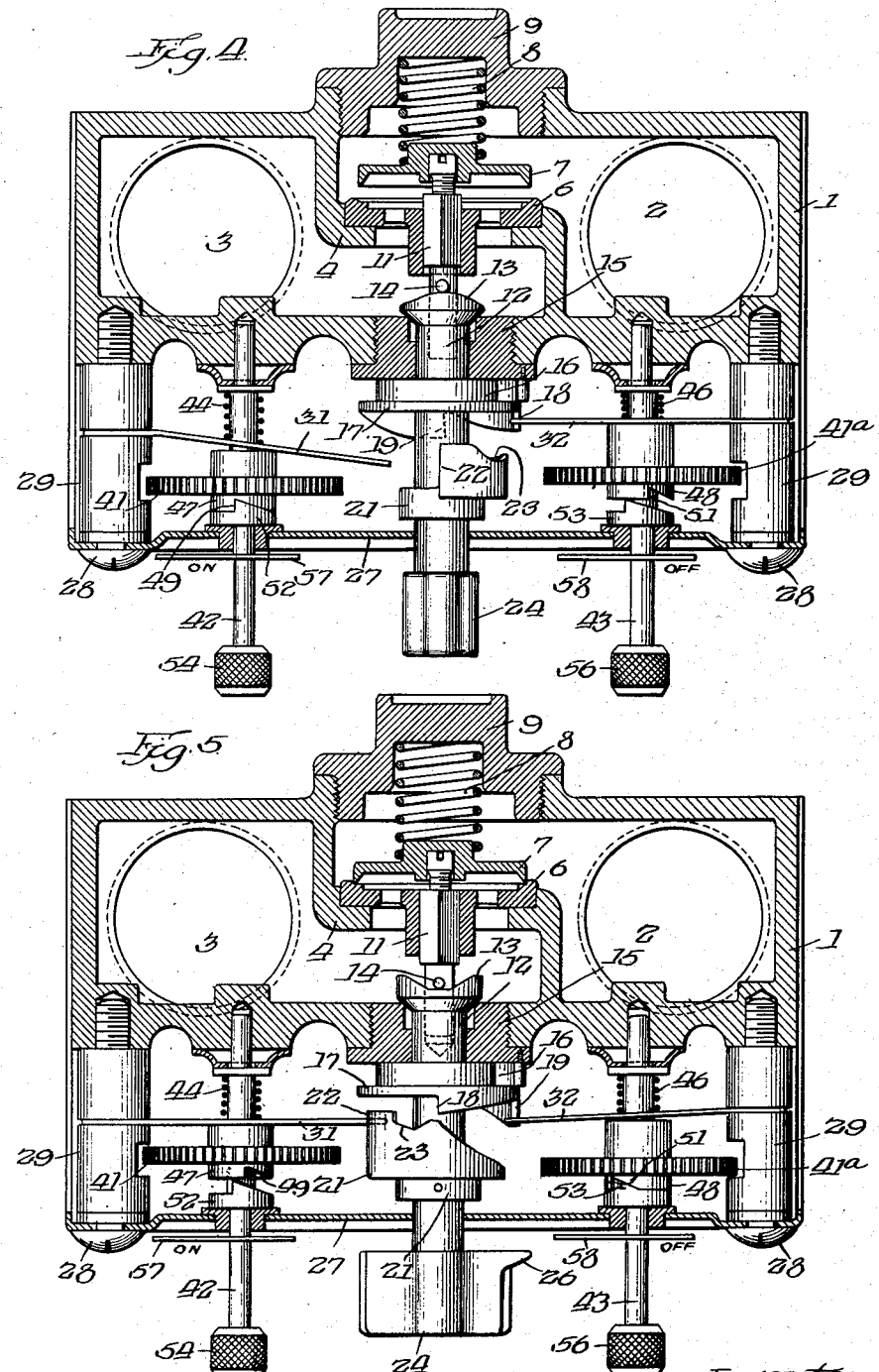

Patented Aug. 27, 1935

2,012,532

UNITED STATES PATENT OFFICE 2,012,532

TIME CONTROLLED VALVE

John H. Grayson, Lynwood, and Franz Netschert, Los Angeles, Calif., assignors to Grayson Heat Control, Ltd., Lynwood, Calif., a corporation of California Application September 14, 1931, Serial No. 562,799½

13 Claims. (Cl. 161—9)

This invention relates to time controlled valves and more particularly to a valve that is especially well suited to selectively control the supply of gas to a stove whereby the gas supply to the stove may be automatically turned on and off at predetermined selected periods.

Considerable difficulty has been encountered in time controlled valves designed for gas stove service particularly in providing a valve which may be selectively operated for either automatic operation in accordance with the time mechanism or to permit independent operation of the time mechanism, and which remains gas tight after continued use. It has been the practice in the past to use one or more valves to accomplish the desired end and to use valves of the cock type embodying generally a rotary tapered plug. The use of more than one valve to provide for automatic or independent operation is obviously objectionable in that it increases the number of valves in the system. The use of a tapered plug valve increases the mechanical difficulties, i. e., a tapered plug requires lubrication and is prone to stick even when lubricated. Furthermore, the lubricants commercially available for use dry out because of the heat to which the parts may be subjected or are absorbed to varying degrees by the gases being transported, consequently a valve of the cock type even thoroughly lubricated when installed soon becomes improperly lubricated.

In accordance with this invention a single valve is employed and preferably a single element is used as an indicator, setting device and controller to take the operation of the valve out of the control of the time mechanism. In one form of the invention it is contemplated to utilize a single clock mechanism, preferably an electric clock, to actuate one setting device for opening the valve and another setting device for closing the valve at selected predetermined periods.

Other novel features of my invention will be apparent from the following description given in connection with the drawings, in which:

Fig. 1 is a front elevation of a time controlled valve constructed in accordance with this invention;

Fig. 2 is a transverse horizontal section through the valve below the clock mechanism illustrating the valve open and set to permit manual operation of the stove independently of the automatic time control as distinguished from automatic operation;

Fig. 3 is a similar section illustrating the valve closed and set for automatic operation;

Fig. 4 is a similar section illustrating the valve as having been automatically opened by the automatic time control mechanism;

Fig. 5 is a similar section illustrating the valve as just having been closed by the time control mechanism;

Fig. 6 is a schematic elevation illustrating the drive train through the clock mechanism to the setting mechanism for causing automatic opening and closing of the valve; and Fig. 7 is a schematic perspective illustrating the relative positions of the valve cams on a single control shaft for the valve.

In the illustrated embodiment of this invention there is shown a time controlled valve that is particularly well suited to control the gas supply to a stove or heater and in which the supply may be controlled selectively either manually or automatically. For full automatic operation it is necessary of course that the valve be so arranged that it is capable of being opened by the clock mechanism at any selected time either present or future and closed at any predetermined time after the desired interval or open period has lapsed. It is also desirable and necessary to all practical purposes that the valve may be maintained open or closed independently of the clock mechanism so that the stove or other appliance being supplied with gas may be operated independently of the time control mechanism and that the valve will remain closed after having been previously opened and closed by the clock mechanism until reset for another period. It is preferable to have an indicating means to indicate the position and condition of the valve at a glance, that is, the indicator should tell what position the valve occupies and whether or not the stove is set for automatic or manual operation.

It will facilitate an understanding of the construction involved in the illustrated embodiment of this invention to give a general description of the time controlled valve in its various positions as shown in Figs. 2 to 5 inclusive before giving a detailed description of the construction of the mechanism involved. The time control valve comprises generally a casing or body 1 having inlet and outlet chambers therein provided, respectively, with an inlet 2 and an outlet 3, the said chambers being on opposite sides of a ported partition wall 4 having a valve seat 6 therein against which a reciprocating poppet valve 7 seats to control the flow through the casing.

In Fig. 2 the valve is shown in open position being permanently set in this position in order that the supply of gas through the valve is uninterrupted whereby the stove supplied through the valve may be operated manually, that is, independently of the time controlled valve. For full automatic operation the valve must be closed and accordingly the control shaft is moved manually to close the valve and set it for automatic operation. In Fig. 3 the valve is shown as set for the start of automatic operation and is closed and set to be operated by the clock mechanism, the "opening" or "on" setting mechanism being about to function to open the valve. In Fig. 4 the valve is shown as just having been opened by the "on" setting mechanism and consequently gas will flow until the valve is closed by the "off" setting mechanism. In Fig. 5 the valve is shown as having just been closed by the closing or "off" setting mechanism thus completing the full cycle of the automatic operation of the time controlled valve. It will be understood that the opening and closing setting mechanism indicated as "on" and "off" is driven from a single clock mechanism, preferably an electric clock, and is adjustable to any desired periods. In the illustrated form of this invention the clock mechanism serves only to release the holding or limiting devices and the valve is operated to either closed or open position by other means, that is, the clock mechanism does not have the burden of actually operating the valve.

Having in mind the general operation of the time control valve the detailed description of the mechanism will now be given with particular reference to the drawings. The valve 7 is normally urged to closed position by a compression spring 8 disposed between the outer face of the valve and the inner face of a removable plug 9 screwed into the rear wall of the valve housing. The valve is actuated by an adjustable stem 11, adjustable in length which projects through a central guide opening formed in the valve seat. That portion of the stem which fits within the guide is squared as is the guide opening through the seat to prevent rotation of the stem. The front end portion of the stem is reduced in diameter and formed circular in cross section and extends into a counterbore in the rear end of a valve actuating or cam shaft 12 the latter being provided with a cam 13 upon its rear end which engages a cross pin 14 inserted through the reduced portion of the valve stem. Cam 13 is provided with a pair of diametrically opposite shoulders and a pair of intermediate diametrically opposite depressions whereby each quarter revolution of the cam results in an opening or closing movement of the valve as can readily be seen from Figs. 2 and 3. The square portion of valve stem 11 insures reciprocating movements of the stem as cam 13 is rotated with shaft 12. Control shaft 12 is journalled in a bushing 15 in the front wall of the valve casing and immediately outside thereof is engaged by a spiral clock spring 16 which normally tends to rotate the shaft in counter-clockwise direction indicated by the arrow in Fig. 2.

To prevent rotation of shaft 12 under the influence of spring 16 except at specified times, whereby the action of valve 8 is controlled to open and close at predetermined periods, two setting mechanisms are provided. For this purpose shaft 12 is provided with a stop or limiting cam 17 having a pair of projecting shoulders 18 and 19 spaced 90° apart, shoulder 18 preceding shoulder 19 in the direction of normal rotation of the cam under influence of the spring. Shoulder 18 is in alignment with the low point of cam 13 and shoulder 19 is accordingly in alignment with the high point of cam 13 so that engagement of the shoulders 18 and 19 by a limiting device will respectively limit rotation of shaft 12 and hold the same in position to hold valve 7 in either closed or open position respectively. Shaft 12 is provided with a third cam 21 having a shoulder 22 thereon, 90° in advance of shoulder 18 whereby engagement of shoulder 22 with a limiting device will also hold shaft 12 in position to maintain the valve 7 open. Cam 21 is also provided with a retaining notch 23 thereon 90° behind shoulder 22 and in alignment with shoulder 18 of cam 17 the purpose of this notch being to yieldingly retain shaft 12 in position with valve 7 open as will hereinafter be further explained.

The outer end of shaft 12 carries an indicating and operating knob or handle 24 having a pointer 26 arranged to play over a dial bearing the legends manual, start, off, and on, embossed upon the front plate 27 secured to the front wall of the valve housing in spaced relation thereto by screws 28 and studs 29. Knob 24 and its pointer 26 will readily indicate the position of shaft 12 and the position and condition of valve 7, that is, it indicates both whether the valve is open or closed and whether it is under the control of the clock mechanism or set for manual control as will be later more fully described.

The limiting or stopping devices further include a pair of locking detents in the form of leaf springs 31 and 32 disposed upon opposite sides of shaft 12 in position to engage the cams. The springs are secured at one end to the valve body by screws 28 and studs 29. Spring detent 31 is arranged to engage either shoulder 19 of cam 17 or shoulder 22 of cam 21 in accordance with conditions later explained whereby shaft 12 will be retained in either of two positions with the valve closed, as shown in Figs. 3 and 5, and said detent is also adapted to engage notch 23 in cam 22 to hold the valve open, as shown in Fig. 2. Spring detent 32 is arranged to engage shoulders 18 or 19 of cam 17 and accordingly limits the rotation of shaft 12 to hold the valve either open or closed in accordance with the shoulder engaged. See Figs. 4 and 5. Both spring detents 31 and 32 normally assume a forward position as shown in Figs. 2 to 5 inclusive, in other words their normal tendency is to clear the cams with the exception of engagement of detent 31 against shoulder 22 and detent 32 against shoulder 19.

Spring detents 31 and 32 are released at predetermined periods to permit rotation of shaft 12 and accordingly opening and closing of valve 7 by mechanism driven from the hand shaft 33 of the clock mechanism 34. For this purpose a pinion 36 is placed on the hand shaft 33 and arranged to drive a gear 37 which carries a smaller pinion 38 which in turn drives two independent gear trains comprising two similar gears 39 and 39a which in turn drive two gears 41 and 41a. Gears 41 and 41a are journalled upon a pair of spaced parallel shafts 42 and 43 respectively for both rotation and axial movement thereon. The shafts 42 and 43 are journalled in the front end wall of valve housing 1 and the front plate 27.

The hubs upon one side of gears 41 and 41a engage springs 31 and 32, respectively, the latter being apertured to permit passage of shafts 42 and 43 therethrough and being urged against the gears by additional springs 44 and 46. Gears 41 and 41a are thus urged forwardly as shown in Figs. 4 and 5 by the combined action of the springs themselves and of auxiliary springs 44 and 46. The opposite faces of gears 41 and 41a have hub portions 47 and 48 respectively formed with clutch teeth 49 and 51 which engage similar clutch collars or cams 52 and 53 pinned to shafts 42 and 43 respectively. Shafts 42 and 43 carry knobs 54 and 56 upon their outer ends by means of which the shafts may be manually rotated to set clutch cams 52 and 53 to the desired position to cause clutch teeth 49 and 51 to engage clutch cams 52 and 53 at desired times. Gears 41 and 41a may be permitted to slide axially at any desired predetermined period. Axial movement of gear 41 will permit lateral movement of spring 31 and cause spring 31 to release cam 19 to permit a 90° rotation of shaft 12 under the action of spring 16 until shoulder 18 of cam 17 engages spring 32, under which conditions the valve 7 is opened, as shown in Fig. 4. Also at the time set gear 41a will be permitted to move axially through engagement of clutch 51 and 53 to release spring 32 from engagement with shoulder 18 of cam 17 and thus permit the rotation of shaft 12 another 90° and closing of valve 7, as appears in Fig. 5. It is understood of course that gears 41 and 41a are constantly driven by the clock mechanism. Shafts 42 and 43 are provided with pointers 57 and 58 which play over a dial embossed upon the front plate bearing the hours of the day as can be clearly seen from Fig. 1. Shaft 42 controls the opening of the valve and is accordingly designated "on" whereas shaft 43 controls the closing of the valve and is designated as the "off" shaft.

For manual operation knob 24 is turned in a clockwise direction to the manual position which winds spring 16 and opens valve 7 through engagement of cam 13 with pin 14. Shaft 12 is held in this position by engagement of spring 31 in the recess 23 of cam 21. In this position which is shown in Fig. 2 spring 32 does not engage either cam and the stove or other device being supplied with gas is then set for manual operation independently of the clock mechanism or time controlled valve.

If it is desired to have valve 7 closed and control the stove automatically, that is, to open and close the valve at some predetermined future time, knob 24 and accordingly shaft 12 is turned counter-clockwise to the start position indicated in Figs. 1 and 3. In these figures the clock is shown as indicating about three o'clock and the time controlled valve set to open at half past three o'clock and close at half past five o'clock. The valve will remain closed until the opening time set. Shaft 12 is maintained in the start position by engagement of spring 31 with shoulder 19 of cam 17. As the clock mechanism is constantly rotating, gears 41 will at the time set, in the present instance 3:30 o'clock, be permitted to slide axially until clutch dog 49 engages clutch 52 as shown in Fig. 4 and accordingly permit spring 31 to move forwardly to release shoulder 19 of cam 17. This will permit a 90° rotation of shaft 12 at which point shoulder 18 will engage spring 32 thus holding valve 7 in open position as shown in Fig. 4. The valve will be maintained open until the predetermined time set, 5:30 o'clock in the present instance, at which time clutch dog 51 will engage clutch 53 and permit gear 41a to slide axially forwardly to release spring 32 from shoulder 19. This movement of spring 32 will permit another 90° rotation of shaft 12 to close valve 7 at which time spring 32 will engage shoulder 19. In this position spring 31 will also engage shoulder 22 of cam 21. Regardless of any further rotation of gears 41 and 41a the clock mechanism will not be operative to permit further rotation of shaft 12 and accordingly valve 7 will remain closed until reset manually to either the manual or start positions.

From the foregoing description of the illustrated embodiment of this invention and its operation it will be apparent that there has been provided a comparatively simple mechanism involving only a single valve and a single shaft for operating, controlling or actuating the valve automatically or setting the valve open for manual operation. The single knob 26 upon the outer end of shaft 12 is the only knob necessary to operate to either place the valve under control of the clock mechanism or take it out of control of the clock mechanism to permit independent manual operation of the stove or other device being supplied through valve 7. The use of the two independent setting mechanisms including the two trains of gears operated by a common clock mechanism permits of full automatic operation of the valve when desired by means of which the valve may be set to closed position and it will be automatically opened and closed at predetermined future times to permit of a flow of gas through a valve for a predetermined definite period.

It is obvious to those skilled in the art that pilot lights will be used upon the stove or other device being supplied and that the usual manual cocks will be employed upon the individual burners for manual operation in the usual manner, and also that an oven heat regulator will be provided in most cases for maintaining a selected temperature in the oven so long as the oven burner is in operation. It will also be apparent to those skilled in the art that many changes may be made in the details of construction and that the principles of this invention may be applied to other specific devices without departing from the spirit and scope of this invention as defined in the appended claims.

We claim:
1. In a time controlled valve, a valve casing having a port therethrough with a single valve therein arranged to control flow through said port, a continuously operated clock mechanism, cam mechanism normally tending to turn in one direction from a starting position for operating said valve automatically to opened and then closed position, means operable by said clock mechanism for selectively permitting actuation of said cam mechanism at predetermined times, and a single manual control member for turning said cam mechanism back to starting position, said cam mechanism being constructed so that it may be turned by said number back beyond starting position to another position to maintain the valve in open position independent of control by the clock mechanism.

2. In a time controlled valve, a valve casing having a port therethrough with a valve therein arranged to control the flow through said port, a shaft having means thereon for actuating said valve to open and closed positions upon rotation of said shaft, means for normally rotating said shaft in one direction from a starting position, means for successively stopping rotation of said shaft in turning from the starting position, first in an opened and then a closed position of the valve, a continuously operated clock mechanism, means actuated by said clock mechanism for releasing said stopping means to permit the aforesaid movements of said shaft at predetermined periods, a single hand operable member for rotating said shaft back to starting position or beyond said position to another position for opening said valve, and detent means for releasably holding said shaft in the latter position independently of control by said clock mechanism.

3. In a time controlled valve, a clock mechanism, a valve casing behind the clock mechanism having a port therethrough with a reciprocating valve therein arranged to control the flow through said port, said valve having an operating stem extending therefrom, and a spring normally urging the valve in one direction, a single control shaft extending through the clock having a single handle on the front end thereof to permit manual rotation of said shaft and having a cam on the rear end for pushing said stem to move the valve axially relative to the shaft in the turning of the latter to open and close the valve, a spring for normally rotating said shaft in one direction, a pair of limiting abutments for successively limiting rotation of said shaft in said direction in the opened and closed positions of the valve, and means actuated by said clock mechanism for releasing said limiting means to permit successive rotations of said shaft at predetermined periods.

4. In a time controlled valve, a clock mechanism a valve casing having a port therethrough with a valve therein arranged to control the flow through said port, a single rotatable control shaft having means for actuating said valve to open and closed positions upon rotation of said shaft, spring means for normally rotating said shaft in one direction, a single manually operable means for rotating said shaft to energize the spring means, a time setting mechanism driven from said clock mechanism by a gear connection and including a detent for preventing rotation of said shaft until released by the detent upon clock actuation of the latter at a predetermined time, a second time setting mechanism driven from said clock mechanism by another gear connection and including another detent for preventing rotation of said shaft until released by the detent upon clock actuation of the latter at a predetermined time independently of said first mentioned time setting mechanism, said shaft being rotatable by the single manually operable means to an extreme position relative to the two time setting mechanism, and means for releasably holding said shaft in the extreme position to hold said valve open independently of said clock mechanism and time setting mechanisms.

5. In a time controlled valve, a valve casing having a port therethrough, a reciprocating valve therein arranged to control the flow through said port, a shaft having a cam thereon for actuating said valve to open and closed positions, means for normally rotating said shaft in one direction, a second cam carried by said shaft, a pair of movable abutments arranged to selectively engage said second cam for limiting rotation of said shaft in said direction, clock mechanism, means actuated by said clock mechanism for releasing said limiting abutments to permit successive rotations of said shaft at predetermined periods, and means on said shaft arranged to engage one of said abutments to retain said shaft in position to maintain said valve open independently of said clock mechanism.

6. In a time controlled valve, a valve casing having a port therethrough with a reciprocating valve therein arranged to control the flow through said port, a shaft having a cam thereon for actuating said valve to open and closed positions, means for normally rotating said shaft in one direction, a second cam carried by said shaft, a pair of movable abutments arranged to selectively engage said second cam for limiting rotation of said shaft in said direction, clock mechanism, means actuated by said clock mechanism for releasing said limiting abutments to permit successive rotations of said shaft at predetermined periods, and another cam on said shaft arranged to engage one of said abutments to hold said shaft in position to maintain said valve open independently of said clock mechanism.

7. In a time controlled valve, a valve casing having a port therethrough and a reciprocating valve therein arranged to control the flow through said port, a shaft extending through said casing having a cam thereon within said casing for actuating said valve to open and closed positions, means for normally rotating said shaft in one direction, a second cam carried by said shaft, a pair of movable abutments arranged to selectively engage said second cam for limiting rotation of said shaft in said direction, clock mechanism, means actuated by said clock mechanism for releasing said limiting abutments to permit successive rotations of said shaft at predetermined periods, another cam on said shaft arranged to engage one of said abutments to hold said shaft in position to disassociate it from said clock mechanism, and means on the exterior portion of said shaft for manually rotating the latter.

8. In a time controlled valve, a valve casing having a port therethrough, a reciprocating valve therein arranged to control the flow through said port, a shaft having a cam thereon for actuating said valve to open and closed positions, means for normally rotating said shaft in one direction, a second cam carried by said shaft, a pair of movable abutments arranged to selectively engage said second cam for limiting rotation of said shaft in said direction, clock mechanism, means actuated by said clock mechanism for releasing said limiting abutments to permit successive rotations of said shaft at predetermined periods, and means whereby the shaft is arranged to be held in position to maintain said valve open independently of said clock mechanism.

9. In a time controlled valve, a valve casing having a port therethrough with a reciprocating valve therein arranged to control the flow through said port, a shaft having a cam thereon for actuating said valve to open and closed positions, means for normally rotating said shaft in one direction, a second cam carried by said shaft, a pair of movable abutments arranged to selectively engage said second cam for limiting rotation of said shaft in said direction, clock mechanism, means actuated by said clock mechanism for releasing said limiting abutments to permit successive rotations of said shaft at predetermined periods, and means on said shaft arranged to releasably engage an abutment to hold the shaft in position to maintain said valve open independently of said clock mechanism.

10. In a timing mechanism, the combination with a clock mechanism, of an operator, spring means for moving the operator in one direction, a handle for moving the operator in the other direction, first and second stage setting members, first and second stage trip members, the latter being driven by the clock mechanism, and connections between the trip members and the operator whereby the operator is automatically releasable after a predetermined first and second time period when the operator is turned by the handle to the starting position of a clock control range, and whereby said operator is arranged to be turned by the handle out of the clock range to a position in which the operator is independent of clock control.

11. In a timing mechanism, the combination with a clock movement having a conventional clock face, of an operator, spring means for turning the operator in one direction, a handle disposed adjacent the clock face for turning the operator in the other direction, a first stage auxiliary clock face on one side of the handle, a second stage auxiliary clock face on the other side of the handle, first and second stage setting members cooperating with said auxiliary clock faces, first and second stage trip members driven by the clock movement, connections between the trip members and the operator whereby the latter is automatically releasable after a predetermined first and second time period, said connections being constructed to permit the operator to be turned by the handle to a predetermined position in which the operator is independent of control by the clock movement, and means for releasably holding the operator in said position.

12. In a timing mechanism, the combination with a clock movement, of an operator, spring means for moving said operator in one direction, a handle for moving said operator in the other direction, a first and second stage gear train, both driven through connections with the clock movement, a first stage setting member associated with the terminal gear of the first stage gear train, a second stage setting member associated with the terminal gear of the second stage gear train, a first stage detent and a second stage detent for automatically releasing the operator after a variable predetermined first and second time period, said detents being held in cocked positions by the aforesaid terminal gears, said terminal gears being movable axially when turned by the clock to proper relationship to the setting members to move the detents to released positions, spring means tending to move said gears and detents in such direction, the operator being movable by means of its handle to another position independent of control by the clock mechanism, and means for releasably holding said operator in such position.

13. In a time controlled valve, the combination of a valve casing, a reciprocating valve for controlling flow through said casing, an operator having a cam for operating the valve to open and closed positions in the turning of the operator, spring means normally turning said operator in one direction, a second cam on the operator, a pair of movable detents arranged to engage the second cam to stop rotation of the operator under power of the spring means, clock mechanism, two gear trains both driven by the clock mechanism providing two terminal gears whose positions determine the positions of the detents, two setting members rotatable with respect to suitable clock dials whereby to hold said terminal gears selectively in operative position until the lapse of a first and second time period, whereupon said gears are movable to inoperative positions to release the detents, and means on the operator arranged to releasably hold the operator in a position to maintain said valve open independently of the clock mechanism.

JOHN H. GRAYSON.
FRANZ NETSCHERT.